(12) United States Patent
Kwon et al.

(10) Patent No.: US 11,356,982 B2
(45) Date of Patent: *Jun. 7, 2022

(54) SYMBOL MAPPING METHOD FOR REPETITION CHANNEL CODING

(71) Applicant: Optis Cellular Technology, LLC, Plano, TX (US)

(72) Inventors: Yeong Hyeon Kwon, Anyang-si (KR); Seung Hee Han, Anyang-si (KR); Hyun Woo Lee, Anyang-si (KR); Sung Ho Moon, Anyang-si (KR); Jin Sam Kwak, Anyang-si (KR); Dong Cheol Kim, Anyang-si (KR); Min Seok Noh, Anyang-si (KR)

(73) Assignee: Optis Cellular Technology, LLC, Plano, TX (US)

( * ) Notice: Subject to any disclaimer, the term of this patent is extended or adjusted under 35 U.S.C. 154(b) by 537 days.

This patent is subject to a terminal disclaimer.

(21) Appl. No.: 15/947,074

(22) Filed: Apr. 6, 2018

(65) Prior Publication Data

US 2018/0227901 A1    Aug. 9, 2018

Related U.S. Application Data

(63) Continuation of application No. 15/623,625, filed on Jun. 15, 2017, now Pat. No. 9,967,864, which is a
(Continued)

(51) Int. Cl.
*H04W 72/04* (2009.01)
*H04L 1/00* (2006.01)
(Continued)

(52) U.S. Cl.
CPC ....... *H04W 72/0406* (2013.01); *H04L 1/0071* (2013.01); *H04L 1/08* (2013.01);
(Continued)

(58) Field of Classification Search
CPC ............ H04W 72/04; H04W 72/0406; H04W 72/042; H04W 72/1273; H04W 72/1289;
(Continued)

(56) References Cited

U.S. PATENT DOCUMENTS 6,259,744 B1 *   7/2001  Lee .................. H04L 1/0088
                                                    375/264
7,639,660 B2    12/2009  Kim et al.
(Continued)

FOREIGN PATENT DOCUMENTS

CA          2 637 594 A1    7/2007
EP          1783942 A1      5/2007
(Continued)

OTHER PUBLICATIONS

C. Gessner, "UMTS Long Term Evolution (L TE) Technology Introduction", Application Note 1 MA111, Sep. 2008, 55 pages.
(Continued)

*Primary Examiner* — Chi Ho A Lee
(74) *Attorney, Agent, or Firm* — Nixon & Vanderhye P.C.

(57) ABSTRACT

A symbol mapping method for repetition coding is disclosed. The symbol mapping method comprises performing repetition coding on codeword to output repeated codeword symbols, and mapping the repeated codeword symbols with subcarriers located in different localized resource blocks. According to the embodiments of the present invention, it is possible to obtain maximum reliability in a receiving side by mapping codeword bits with subcarriers to reduce the number of bits having low reliability when a transmitting side uses repetition coding. Also, it is possible to improve decoding throughput and obtain channel diversity.

6 Claims, 8 Drawing Sheets

Related U.S. Application Data continuation of application No. 15/172,137, filed on Jun. 2, 2016, now Pat. No. 9,706,531, which is a continuation of application No. 14/307,383, filed on Jun. 17, 2014, now Pat. No. 9,386,567, which is a continuation of application No. 13/754,538, filed on Jan. 30, 2013, now Pat. No. 8,787,492, which is a continuation of application No. 12/348,121, filed on Jan. 2, 2009, now Pat. No. 8,391,405.

(60) Provisional application No. 61/018,674, filed on Jan. 3, 2008.

(51) Int. Cl.
*H04L 1/08* (2006.01)
*H04L 5/00* (2006.01)

(52) U.S. Cl.
CPC .......... *H04L 5/0007* (2013.01); *H04L 5/0042* (2013.01); *H04L 5/0044* (2013.01); *H04L 5/0058* (2013.01); *H04L 5/0023* (2013.01)

(58) Field of Classification Search
CPC .... H04W 72/0446; H04W 88/02; H04L 5/00; H04L 1/08; H04L 1/00; H04L 5/0058; H04L 1/0071; H04L 5/0007; H04L 5/0042; H04L 5/0044; H04L 5/0023
See application file for complete search history.

(56) References Cited

U.S. PATENT DOCUMENTS

| | | |
|---|---|---|
| 2004/0082356 A1 | 4/2004 | Walton |
| 2004/0161064 A1 | 8/2004 | Brethour et al. |
| 2004/0190597 A1 | 9/2004 | Cowie et al. |
| 2004/0202138 A1 | 10/2004 | Song et al. |
| 2005/0085197 A1 | 4/2005 | Laroia |
| 2007/0116140 A1 | 5/2007 | Sawada |
| 2007/0149137 A1 | 6/2007 | Richardson |
| 2007/0189240 A1 | 8/2007 | Cho et al. |
| 2007/0237117 A1 | 10/2007 | Moon et al. |
| 2007/0242763 A1 | 10/2007 | Li |
| 2007/0263666 A1 | 11/2007 | Yoshii et al. |
| 2008/0037686 A1 | 2/2008 | Akita |
| 2008/0075185 A1 | 3/2008 | Park et al. |
| 2008/0120529 A1 | 5/2008 | Sugiura |
| 2008/0181181 A1 | 7/2008 | Gorokhov et al. |
| 2008/0225822 A1 | 9/2008 | Zhang et al. |
| 2008/0240159 A1 | 10/2008 | Palanki et al. |
| 2009/0022242 A1 | 1/2009 | Waters et al. |
| 2009/0067543 A1 | 3/2009 | Hsiao et al. |
| 2009/0168909 A1 | 7/2009 | Stadelmeier |
| 2009/0175373 A1 | 7/2009 | Kwon et al. |
| 2009/0303946 A1 | 12/2009 | Yokoyama et al. |
| 2010/0208594 A1 | 8/2010 | Kwon et al. |
| 2010/0239046 A1 | 9/2010 | Chun |
| 2010/0310019 A1 | 12/2010 | Sadr |
| 2010/0329365 A1 | 12/2010 | Li |
| 2011/0047434 A1 | 2/2011 | Walker |
| 2011/0188465 A1 | 8/2011 | Han et al. |
| 2011/0222393 A1 | 9/2011 | Kwak et al. |
| 2013/0136099 A1 | 5/2013 | Kwon et al. |

FOREIGN PATENT DOCUMENTS

| | | |
|---|---|---|
| JP | 10075271 A | 3/1998 |
| WO | 2007011181 A1 | 1/2007 |

OTHER PUBLICATIONS

European Supplementary Search Report dated Jun. 22, 2016 in corresponding EP Application No. 08867993.1. 2 pages.

* cited by examiner

SYMBOL MAPPING METHOD FOR REPETITION CHANNEL CODING

CROSS-REFERENCE TO RELATED APPLICATIONS

This application is a continuation of U.S. patent application Ser. No. 15623,625, filed May 17, 2017, which is a continuation of U.S. patent application Ser. No. 15/172,137 filed Jun. 2, 2016, now U.S. Pat. No. 9,706,531, which is a continuation of U.S. patent application Ser. No. 14/307,383 filed Jun. 17, 2014, which is a continuation of U.S. patent application Ser. No. 13/754,538, filed on Jan. 30, 2013, now U.S. Pat. No. 8,787,492, which is a continuation of U.S. patent application Ser. No. 12/348,121, filed on Jan. 2, 2009, now U.S. Pat. No. 8,391,405, which also claims the benefit of earlier filing date and right of priority to Korean Patent Application No. 10-2008-0022477, filed on Mar. 11, 2008, and pursuant to 35 U.S.C. § 119(e), and also claims the benefit of U.S. Provisional Application Ser. No. 61/018,674, filed on Jan. 3, 2008, the contents of all of which are hereby incorporated by references herein in their entireties.

FIELD OF THE INVENTION

The present invention relates to a symbol mapping method, and more particularly, to a method for mapping codeword bits with subcarriers to reduce the number of bits having low reliability when a receiving side uses repetition coding.

DISCUSSION OF THE RELATED ART

For wireless communication, channel coding is designed to minimize its option considering complexity of a receiving side and a transmitting side. However, in an actual communication system, a code rate lower than that of the designed channel coding may be required considering system coverage and throughput deterioration in a specific position within a cell. In this case, in IEEE 802.16 or 3GPP LTE (Long Term Evolution) system, a repetition coding has been introduced. Particularly, in case of packet retransmission, effect of repetition coding can naturally be obtained through HARQ operation. However, in case of control channel, packets include repetition coding during initial transmission to obtain effect of repetition channel.

FIG. 1 briefly illustrates a procedure of conversion of packets to OFDM transmission signals when channel coding is generally used.

If a source operation is required, a data packet is converted through, for example, an interleaving or ordering scheme (110). The converted bits become codewords by channel coding (120), and before the codewords are converted to actual transmission symbols, channel interleaver (130) is used, if necessary, to obtain diversity. Afterwards, the codeword bits are converted to channel symbols in accordance with a transmission modulation order through channel symbol modulation (140), and can be allocated from a channel symbol mapper (150) to a subcarrier position. If MIMO (Multi-Input Multi-Output)operation (160) is included in a mapping procedure (170) of mapping channel symbols with OFDM symbols, the MIMO operation (160) may be performed before or after the channel symbols are mapped with subcarriers.

In this case, repetition coding may be performed in the channel coding procedure (120), or may be performed after the bits are converted to the channel symbols (140). When repetition coding is performed in a unit of codeword bits, saving effect of subcarriers can be obtained if the number of codeword bits does not reach a multiple of the number of channel modulation bits.

After the channel coding codewords generated as above are received by a receiving side, they are decoded to the original data packet by a decoding algorithm. However, for optimal decoding, all codeword bits should have same reliability, or reliability should be distributed in accordance with a structure of specific channel coding. If not so, suboptimal throughput is obtained. This is applied regardless of the fact that repetition is performed in a bit level or a symbol level.

If repetition coding is used, repetition coding starts with repetition of original codewords. Repetition coding can be comprised of bit level repetition. Bit level repetition can be performed in a source bit type of FIG. 2 or a codeword bit type of FIG. 3. As illustrated in FIG. 4, after codewords are converted to transmission symbols, a repetition method of the transmission symbols may be used.

In FIG. 2 to FIG. 4, difference in actual throughput is determined by total energy used in transmission. If total code rates are uniformly provided, similar throughput is obtained regardless of the methods in FIG. 2 to FIG. 4. However, if repetition is performed in a bit level, it is advantageous in that subcarriers can be used more effectively when the system transmits a signal.

If repetition coding is used, channel variation of each bit should be minimized so that a receiving side obtains optimal diversity effect. However, in an actual wireless communication channel, channel status is varied per subcarrier and reliability of codeword bits is varied depending on gain. Namely, reliability of specific code bits may be deteriorated by deep fading of channel. Accordingly, the transmitting side should properly set a mapping mode for mapping codeword bits with subcarriers, considering such channel variation.

However, in case of the current IEEE 802.16 system, although repetition is defined in a codeword bit level, there is no specific mapping order after codeword bits are converted to channel symbols, and repetition simply follows a symbol mapping order of the whole system. Particularly, if codewords become a multiple of a specific length, effect according to repetition is simply changed to chase combining, and very poor decoding throughput is caused.

SUMMARY OF THE INVENTION

Accordingly, the present invention is directed to a symbol mapping method for repetition channel coding, which substantially obviates one or more problems due to limitations and disadvantages of the related art.

An object of the present invention is to provide a symbol mapping method for repetition channel coding which enables maximum reliability in receiving side by mapping codeword bits with subcarriers to reduce the number of bits having low reliability when a transmitting side uses repetition coding.

To achieve the object and other advantages and in accordance with the purpose of the invention, as embodied and broadly described herein, a symbol mapping method according to one embodiment of the present invention comprises performing repetition coding on codeword to output repeated codeword symbols, and mapping the repeated codeword symbols with subcarriers located in different localized resource blocks.

In another aspect of the present invention, a symbol mapping method according to another embodiment of the present invention comprises performing repetition coding on codeword to output repeated codeword symbols, and mapping the repeated codeword symbols with subcarriers located at distributed resource block in a manner that a distance between the subcarriers can be maximized.

According to the embodiments of the present invention, it is possible to obtain maximum reliability in a receiving side by mapping codeword bits with subcarriers to reduce the number of bits having low reliability when a transmitting side uses repetition coding. Also, it is possible to improve decoding throughput and obtain channel diversity.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the preferred embodiments of the present invention will be described with reference to the accompanying drawings. However, it is to be understood that various modifications can be made in the following embodiments of the present invention, and the scope of the present invention is not limited to the following embodiments.

The embodiments of the present invention can be divided in accordance with a position at which a repetition can be performed. Examples of the position at which the repetition can be performed include a case where repetition is applied in a bit level and a case where repetition is applied in a symbol level. Also, examples of the position to which repetition can be applied include a case where repetition is applied before performing interleaving by an interleaver and a case where repetition is applied after the interleaving.

However, repetition of source bits or repetition before the interleaving is not proper. Instead, if repetition is performed after the interleaving in a bit level or symbol level, a mapping rule for obtaining diversity of channel can be made.

Figure 1:
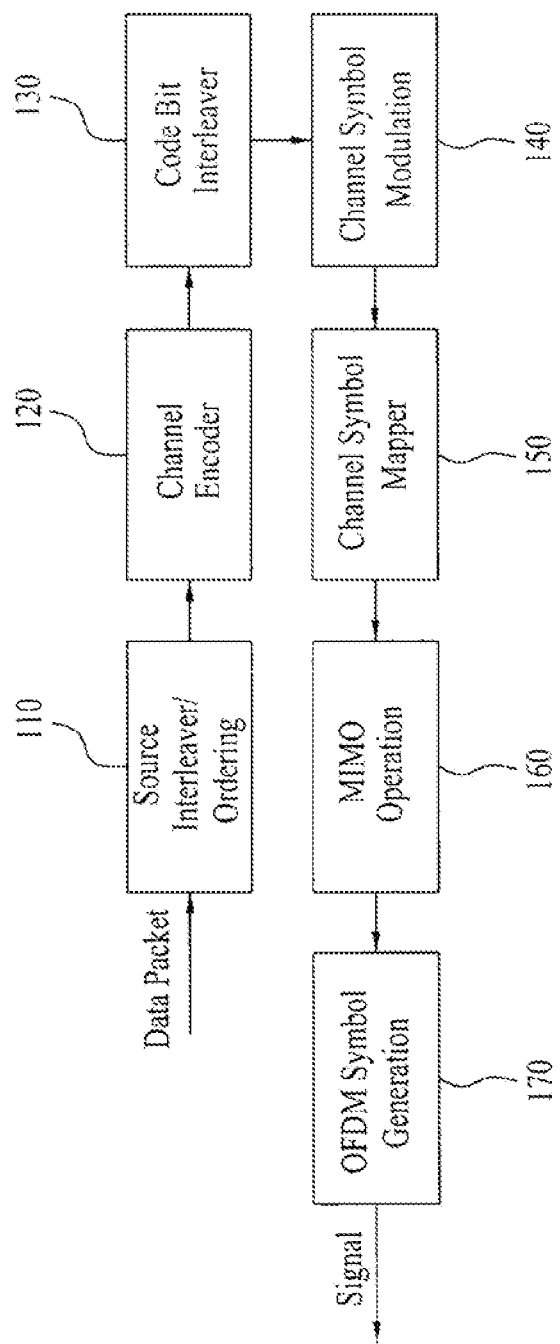
FIG. 1 is a diagram illustrating an example of a method for generating OFDM symbols according to the related art.
Figure 2:
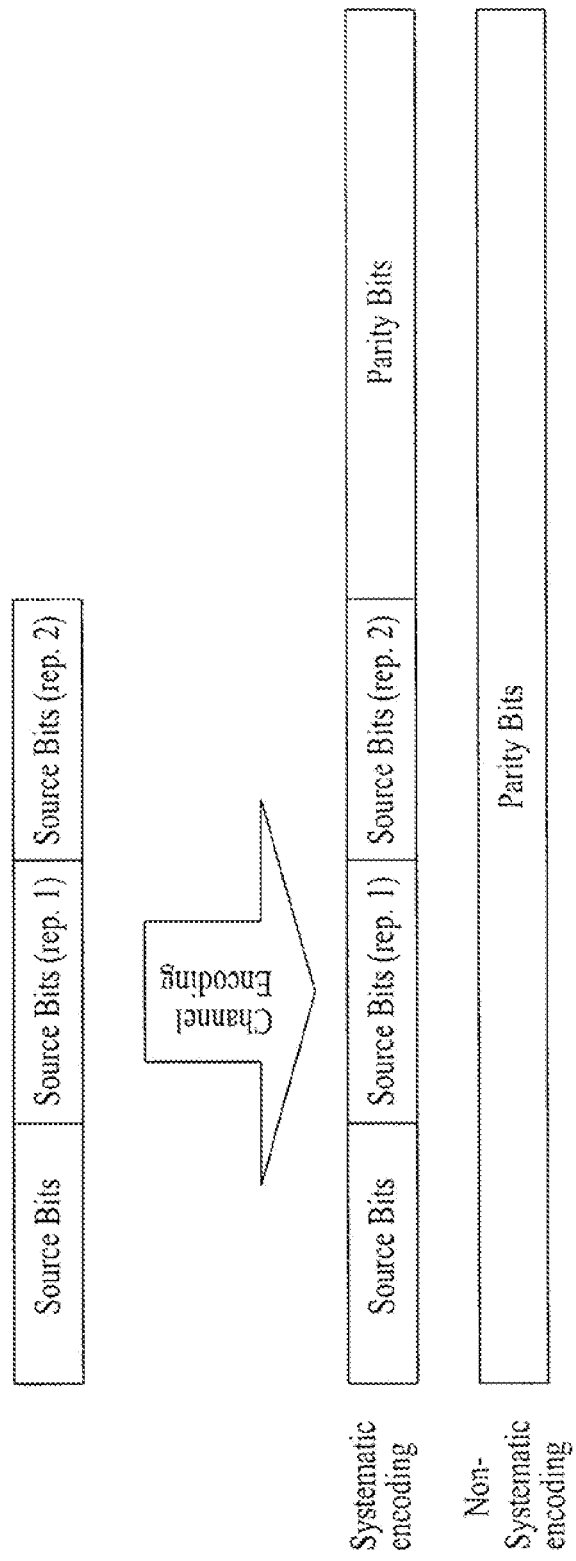
FIG. 2 is a diagram illustrating an example of repetition coding for repeating source bits.
Figure 3:
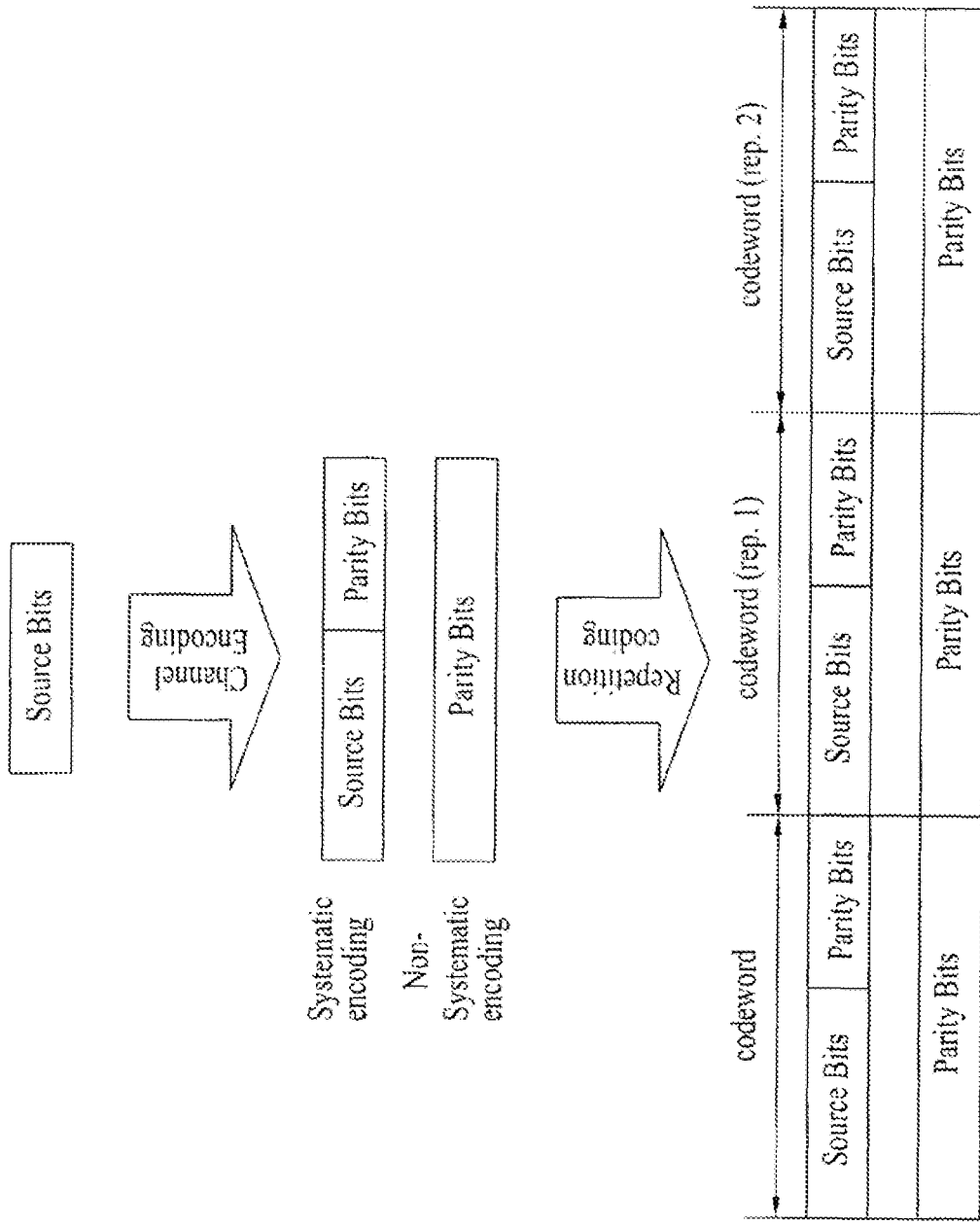
FIG. 3 is a diagram illustrating an example of repetition coding for repeating codeword bits.
Figure 4:
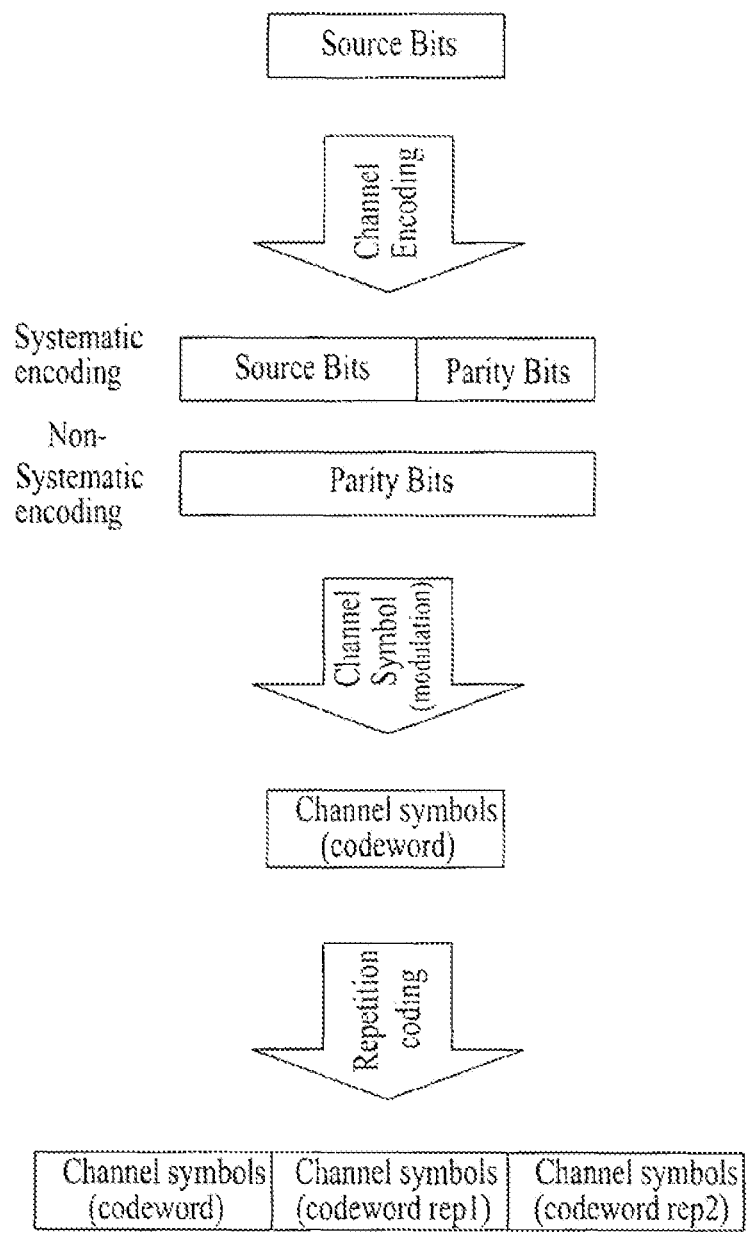
FIG. 4 is a diagram illustrating an example of repetition coding for repeating the result modulated using channel symbols.
Figure 5:
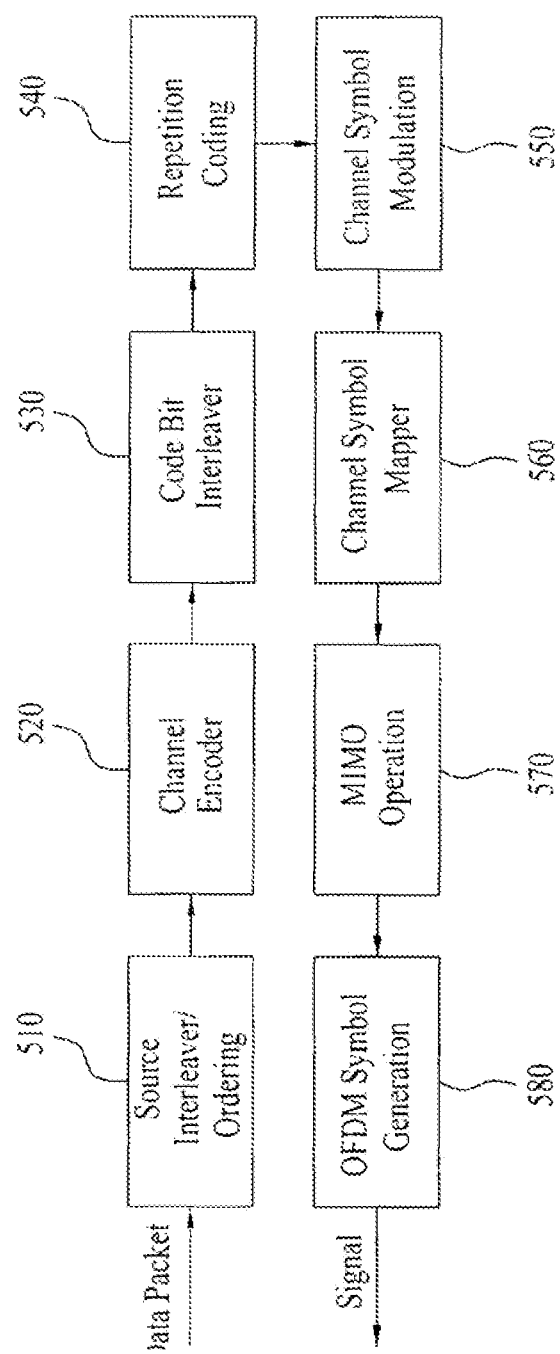
FIG. 5 is a diagram illustrating a method for generating OFDM symbols according to an embodiment of the present invention when repetition coding is performed before channel symbols are generated.
Figure 6:
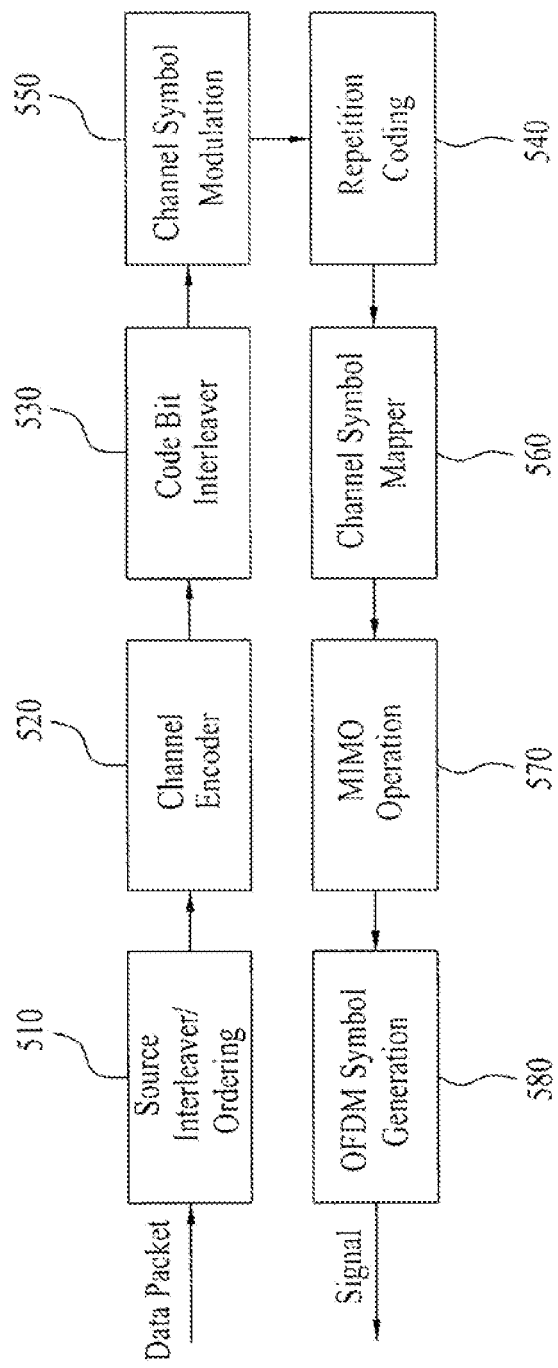
FIG. 6 is a diagram illustrating a method for generating OFDM symbols according to another embodiment of the present invention when repetition coding is performed after channel symbols are generated.

Accordingly, for the position at which repetition coding is performed, two methods are considered as follows. The first method is that codeword bits are directly used as illustrated in FIG. 5 to enhance subcarrier utility. The second method is that modulation is applied to codeword bits as illustrated in FIG. 6 to generate channel symbols and then repetition is performed.

FIG. 5 illustrates a method for generating OFDM symbols according to one embodiment of the present invention when repetition is performed before channel symbols are generated.

First of all, a data packet is converted through, for example, an interleaving or ordering. The converted bits are converted to codewords through channel coding by a channel encoder 520. If necessary, interleaving by an interleaver 530 is applied to the codewords to obtain diversity.

Next, repetition coding (540) is applied to the interleaved codewords. When repetition is performed after the interleaving is performed by the interleaver 530, channel status can be applied to repetition coding most preferably.

Afterwards, channel symbol modulation (550) is performed for each bit generated by the repetition coding to generate channel symbols.

A channel symbol mapper 560 allocates the generated channel symbols to corresponding subcarrier positions. If necessary, the channel symbol mapper 560 performs MIMO operation (570). An additional interleaving can be performed after the repetition coding in case that the channel symbol mapper 560 is a simple mapper which uses sequential mapping on the time or frequency axis.

Finally, OFDM symbols are generated through a mapping procedure (580) of mapping channel symbols with OFDM symbols.

FIG. 6 illustrates a method for generating OFDM symbols according to another embodiment of the present invention when repetition coding is applied after channel symbols are generated.

First of all, a data packet is converted through, for example, an interleaving or ordering (510). The converted bits are converted to codewords through channel coding by a channel encoding 520. If necessary, interleaving by an interleaver 530 is applied to the codewords to obtain diversity.

Next, channel symbol modulation (550) is performed for each bit of the interleaved codewords to generate channel symbols.

Next, repetition coding (540) is applied to the channel symbols.

A channel symbol mapper 560 allocates the generated channel symbols to corresponding subcarrier positions. If necessary, the channel symbol mapper 560 performs MIMO operation (570). An additional interleaving can be performed after the repetition coding in case that the channel symbol mapper 560 is a simple mapper which uses sequential mapping on the time or frequency axis.

Finally, OFDM symbols are generated through a mapping procedure (580) of mapping channel symbols with OFDM symbols.

In either of FIG. 5 and FIG. 6, repetition throughput can be improved through the channel symbol mapper 560. Namely, a channel symbol mapper 560 can be designed so that repeated codewords have different kinds of diversity per repetition. The channel symbol mapper 560 can be equivalently designed by being replaced with an interleaver at a previous stage. Interleaving can be applied to the modulated symbols or repetition-coded bits.

Generally, in case of an independently distributed channel, signals received through different channels have channel capacity C as expressed in Equation 1.

$$C = \log_2\left(1 + SNR \sum_{i=0}^{N_d-1} |h_i|^2\right) \quad \text{[Equation 1]}$$

In the Equation 1, $N_d$ represents the number of used independent channels, and hi represents gain of a corresponding channel. In this case, channel capacity can be regarded for one symbol. A method for obtaining maximum capacity through this channel is to transmit symbol through the best channel only. On the other hand, in view of decoding of codewords, it is more advantageous for optimal throughput that all codeword bits have the same capacity, i.e., the same reliability than that a specific symbol has high capacity, i.e., high reliability.

Although reliability condition is varied depending on a structure and type of channel coding, if a structure of corresponding channel coding is decoded depending on bit reliability, it is preferable that all codeword bits have the same reliability as each other.

Accordingly, the channel symbol mapper 560 of FIG. 5 and FIG. 6 should allow all codeword bits to have the same value of Equation 1 if possible. This means that all repeated codeword bits/symbols should exist over the whole system bandwidth.

Figure 7:
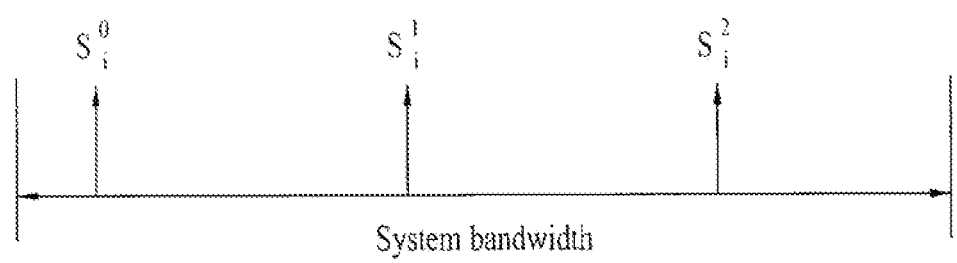
FIG. 7 is a diagram illustrating an example of a symbol mapping method applied to FIG. 5 and FIG. 6.

FIG. 7 illustrates an example of a symbol mapping method applied to FIG. 5 and FIG. 6.

Same codeword bits or symbols should be allocated and arranged at the most constant intervals within the system bandwidth. In this case, when same symbols/bits exist beyond a coherence band, the maximum value of Equation 1 can be obtained.

Since the time order has already been mixed by the interleaver, the symbol mapper allocates symbols/bits of one codeword in the frequency first order in the system band when mapping them.

Although the repeated codewords are interleaved with one another, they should be spaced apart from one another at the maximum interval as illustrated in FIG. 7. Also, if all codeword bits/symbols are not allocated to one OFDM symbol, the other bits/symbols are mapped with the other OFDM symbols.

The above method is the most effective when subcarriers to be used in the whole system bandwidth can be used at a constant interval.

However, in an actual system, subcarrier resources can be allocated in a different method not the constant interval. For example, in case of 3GPP LTE, a mode of distributed resources is a distribution type comprised of a bundle of localized subcarriers. By contrast, in case of a resource allocation structure of IEEE 802.16, a distributed mode is comprised of logical channels, which are respectively arranged at a random subcarrier interval in the whole system bandwidth. Although the 3GPP LTE prescribes that blocks within the coherence bandwidth are beyond diversity range for allocation of subcarriers, the IEEE 802.16 is based on sequences mapped in the order of non-uniform.

Figure 8:
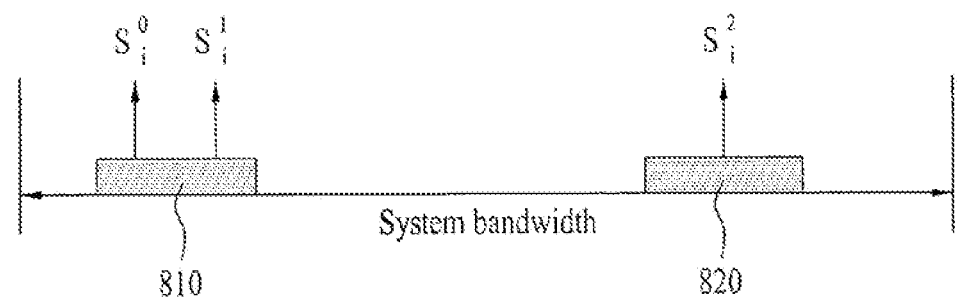
FIG. 8 is a diagram illustrating an example of a symbol mapping method applied to FIG. 5 and FIG. 6 when localized resource blocks are allocated in a distributed mode.

FIG. 8 illustrates an example of a symbol mapping method applied to FIG. 5 and FIG. 6 when localized resource blocks are allocated in a distributed mode.

In case of a distributed mode according to the 3GPP LTE, symbol/bit mapping of codewords is varied depending on the number of repetition times. Also, when localized resource blocks 810, 820 are allocated, symbol/bitmapping of codewords is varied depending on whether how many resource blocks are allocated.

Preferably, same codeword symbols/bits are arranged in different localized resource blocks 810, 820 if possible.

For example, when the number of localized resource blocks 810, 820 is 2 and the number of repetition times is 1, since the number of same codeword bits/symbols is 2, each symbol is mapped with different localized resource blocks 810, 820.

Meanwhile, when the number of repetition times is 2, since the number of same symbols/bits is 3, two of three symbols/bits, i.e., $Si^0$ and $Si^1$ are located in the same localized resource block. In this case, the symbols $Si^0$ and $Si^1$ are arranged to be spaced apart from each other within the same localized resource block and then mapped with subcarriers, so as to obtain the maximum diversity effect.

If the number of repetition times increases, it is preferable that same symbols/bits are allocated to all localized resource blocks uniformly within the limits of the possible and that same symbols are arranged to be spaced apart from one another within the limits of the possible within the same resource blocks.

Meanwhile, in case of a distribution mode based on the IEEE 802.16, since there is no rule for subcarrier allocation position, optimal sequence or mapping can be searched in accordance with each repetition through full search.

However, since search result may be varied depending on the number of logical subchannels used in one OFDM symbol and a rule may be varied depending on the number of a total of OFDM symbols, it is not efficient that a mapping method is searched through full search. It is preferable that a mapping rule is used based on the number of a total of subcarriers used in one OFDM symbol instead of symbol mapping based on the frequency first order in a logical subchannel direction. Namely, instead of channel symbol mapping based on the subchannel order, subcarriers within the used subchannel are mixed and same symbols can be arranged to be spaced apart from one another if possible in accordance with the aforementioned mapping rule. Even if subcarriers are not arranged to be spaced apart from one another at a constant interval, it is preferable that the position of subcarriers, in which same symbols exist, is determined supposing that the subcarriers are arranged at constant intervals.

As described above, the mapping method for mapping channel symbols within one OFDM symbol has been described.

However, in the actual system, the number of OFDM symbols allocated for transmission of one packet is defined as more than one. Particularly, it is likely that resource allocation in the 3GPP LTE or future system will be defined based on TTI which is a transmission unit. In this case, a time axis can also be defined to maximize diversity. Namely, same symbols exist should be spaced apart from each other on the time axis as well as the frequency axis if possible. Particularly, like the 3GPP LTE, if a resource allocation type is a localized distributed allocation type, it is likely that same symbols exist in the same localized resource blocks as a repetition factor increases. In this case, same symbols/bits within the codewords arranged within the same localized resource block or the coherence band can be arranged to be spaced apart from each other on the time axis if possible.

Figure 9:
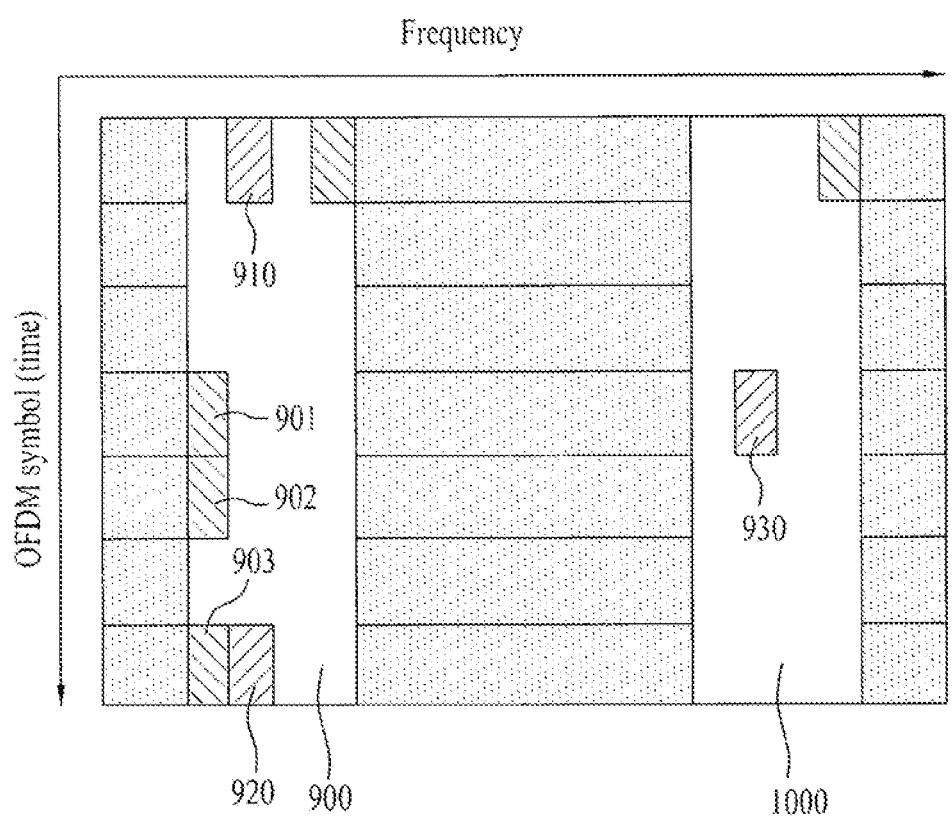
FIG. 9 is a diagram illustrating an example of a symbol mapping method applied to FIG. 5 and FIG. 6 when a time axis is considered.

FIG. 9 illustrates an example of a symbol mapping method applied to FIG. 5 and FIG. 6 when a time axis is considered.

FIG. 9 illustrates several types of repeated symbols when resources are allocated over several OFDM symbols. In FIG. 9, two localized resource blocks 900, 1000 exist.

If the smallest boxes 901, 902, 903, 910, 920, and 930 correspond to one subcarrier, in one OFDM symbol, repeated symbols can be arranged to be most spaced apart along the frequency axis, and the other repeated symbols can be arranged in the other time position.

For symbols 901-903 transmitted at the same frequency bandwidth, it is preferable that the symbols are not arranged to be adjacent to each another (901, 902) on the time axis but arranged at constant intervals on the time axis (902, 903).

Also, for maximum effect, it may be considered that the repeated symbols are arranged to be most spaced apart from each other (910, 920). Moreover, in one OFDM symbol, the other repeated symbols can be arranged in another localized resource block 1000, whereby the minimum number of symbols/bits within the codewords can be obtained. At this time, if the time interval between the repeated symbols is sufficiently great, even though the repeated symbols are arranged in the same resource, effect is not reduced. Accordingly, the symbols are arranged in different localized resources if possible or beyond the coherence band.

The present invention relates to a method for mapping codeword bits with subcarriers so that the number of bits having low reliability is reduced when a transmitting side uses repetition coding. The present invention can be applied to a base station and a mobile station, which constitute a system such as 3GPP LTE system and IEEE 802.16 system, etc.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for transmitting a signal at a base station in a mobile communication system, the method comprising:
   performing repetition coding on an information bit to generate a plurality of codeword bits;
   obtaining a plurality of modulation symbols from the plurality of codeword bits;
   mapping the plurality of modulation symbols to one or more resource-element groups; and
   transmitting the plurality of mapped modulation symbols,
   wherein at least two of the plurality of modulation symbols are mapped non-adjacently from each other in the frequency domain within a same time duration.

2. The method of claim 1, wherein the plurality of mapped modulation symbols are transmitted via a control channel.

3. The method of claim 1, wherein the at least two of the plurality of modulation symbols are mapped non-adjacently from each other in the frequency domain within the same time duration when the plurality of modulation symbols are mapped to two OFDM symbols.

4. A base station comprising a processor and memory, the memory including computer instructions that, when executed by the processor, cause the processor to:
   perform repetition coding on an information bit to generate a plurality of codeword bits;
   obtain a plurality of modulation symbols from the plurality of codeword bits;
   map the plurality of modulation symbols to one or more resource-element groups; and
   transmit the plurality of mapped modulation symbols,
   wherein at least two of the plurality of modulation symbols are mapped non-adjacently from each other in the frequency domain within a same time duration.

5. The base station of claim 4, wherein the plurality of mapped modulation symbols are transmitted via a control channel.

6. The base station of claim 4, wherein the at least two of the plurality of modulation symbols are mapped non-adjacently from each other within the same time duration when the plurality of modulation symbols are mapped to two OFDM symbols.

* * * * *